June 16, 1942.    S. J. EVERETT    2,286,401
MANUFACTURE OF GLASS BARRELS FOR SYRINGES AND OF LIKE TUBULAR ARTICLES
Filed Feb. 26, 1940
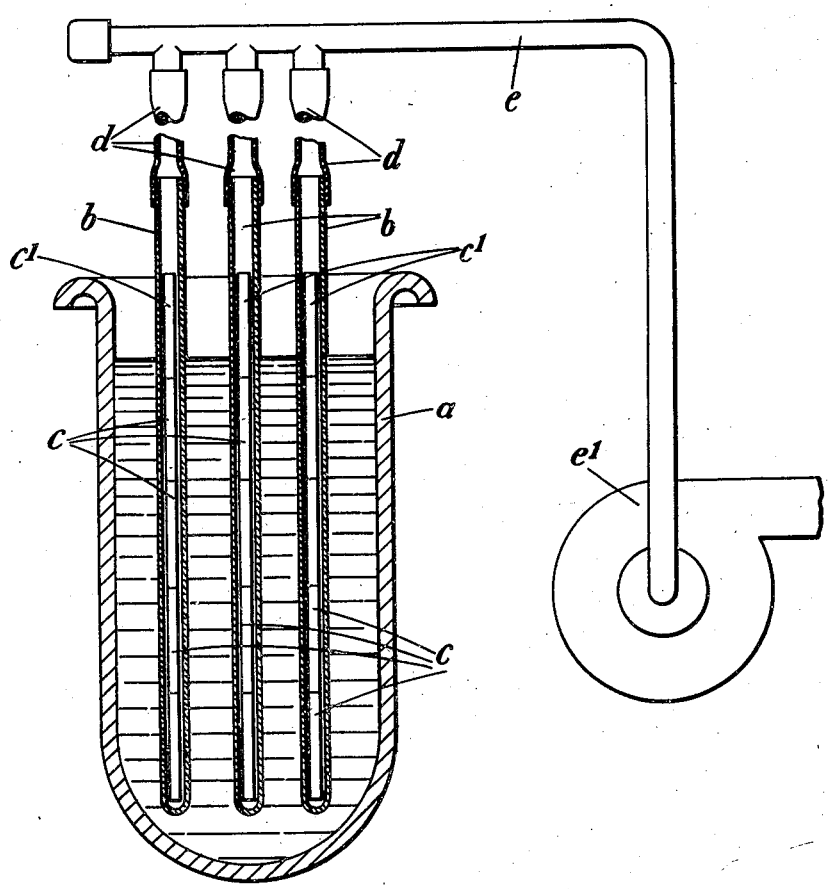
INVENTOR
Samuel J. Everett
BY Sommers Young
ATTORNEYS Patented June 16, 1942

2,286,401

UNITED STATES PATENT OFFICE 2,286,401

MANUFACTURE OF GLASS BARRELS FOR SYRINGES AND OF LIKE TUBULAR ARTICLES

Samuel James Everett, Thornton Heath, England

Application February 26, 1940, Serial No. 320,973
In Great Britain March 22, 1939

3 Claims. (Cl. 49—84)

This invention concerns improvements relating to the manufacture of glass barrels for hypodermic syringes and of like tubular articles, for example burettes, manometers and thermometer tubes, made of glass or a similar non-metallic material which becomes plastic at a moderately high temperature.

A particular object of the invention is to provide improvements in known methods whereby syringe barrels and like tubular articles are shrunk on to mandrels by heating them and applying external pressure in order to reduce their dimensions, especially their internal dimensions, accurately to predetermined values.

According to the invention, an oversize tubular article, such as a tube length from which a glass syringe barrel is to be produced, is shrunk upon a mandrel by immersing the said article in a liquid bath, preferably a salt bath to a temperature above the softening point of the glass or like material but below the temperature at which it becomes sticky and at the same time applying vacuum to the article so that it is subjected to increased external pressure.

The invention is applicable with particular advantage to syringe barrels made of a glass having a low co-efficient of thermal expansion. In this instance, the barrel may be heated to a temperature between 650 and 850° C., but preferably between 760 and 780° C. when a high degree of accuracy and uniformity is required. The temperature limits with other materials will naturally vary with their properties. Particularly with kinds of glass having a higher co-efficient of expansion, it is advantageous to preheat the articles, for example up to 300–600° C., prior to the shrinkage in order to prevent cracking.

Ways of carrying the invention into effect for the application of hypodermic-syringe barrels made of the aforesaid low-expansion glass will now be described by way of example and with reference to the accompanying drawing which is a diagrammatic sectional elevation of suitable means employed for the purposes of this invention.

The starting material is a so-called cane of glass tubing $b$, which is oversize in relation to the internal diameter required for the syringe barrels. This cane is cut into convenient lengths, say about 18" long, and the ends of the said lengths are sealed off. Next a batch of such lengths is graded by means of gauges in respect of approximate internal diameter, say in differences of 1 mm. For example, for producing barrels with a bore of 9 mm. there might be four grades of 10, 11, 12 and 13 mm. approximate bore. This grading is necessary because it is not practically feasible to shrink the tube lengths by more than about 1 mm. at a time. Accordingly, the procedure adopted is to shrink all the lengths of the 13 mm. grade to 12 mm., then to shrink them again with the lengths of the 12 mm. grade to 11 mm. next to add the 11 mm. grade and shrink to 10 mm. and, finally, to shrink the whole batch to 9 mm. Each shrinkage step is performed on metal mandrels $c$ of the diameter to which the grade in question is to shrink. The diameter of the mandrel employed in the final shrinkage stage is smaller than the final bore required by the amount of its expansion of the setting temperature of the glass, allowance being made for the slight expansion of the glass itself at this temperature. The mandrel should be made of a metal to which the glass will not stick, advantageously stainless steel. Both the tube-lengths and mandrels should be kept as clean as possible at all stages.

According to one method of performing the shrinkage, each tube length $b$, containing its appropriate mandrel $c$, is connected at its open end by a rubber connector $d$ to the suction head $e$ of a vacuum pump $e'$ and is then introduced into a salt bath $a$, maintained at a temperature of 770–780° C. in which it is left for five minutes. The glass is thereby rendered plastic and the excess pressure acting upon the exterior of the tube length due to the evacuation of its interior causes the glass to shrink closely upon the mandrel $c$. After the tube lengths have been removed from the bath and allowed to cool until they can be handled they are disconnected from the pump and cooled right off in water. The mandrels are withdrawn and, after the final shrinkage, the tube lengths can be cut and otherwise dealt with in order to produce the final barrels. For continuous operation, two or more pumps are provided and used in succession, the tube lengths being connected to the pumps in batches of, say, three at a time.

After each of the earlier shrinkage stages, all traces of the salt bath should be washed off from the tube lengths. Also the sealed ends should be inspected to see that they remain well sealed. In the final shrinkage stage, the mandrel is advantageously of a composite nature. Thus, in a tube length such as has been described, four mandrels $c$ surmounted by a dummy mandrel $c'$ may be inserted. Four barrel lengths may then be obtained from the shrunk tube by nicking it with a cutting tool just past one end of each mandrel and then breaking the tube.

It will be apparent that in the earlier shrinking stages the mandrel in each tube length may be a metal rod of a length equal to the combined lengths of the superposed mandrels $cc^1$ shown in the drawing.

The shrinkage may alternatively be performed in a molten metal bath, for example a lead bath. A neutral or insert atmosphere is provided over the bath to avoid oxidation of the metal.

The method in accordance with the invention permits of the attainment of bores of accurately predetermined diameter or shape. The accuracy is such that syringe barrels so produced can be used with plungers and other syringe fittings of standard dimensions without any internal grinding being necessary. Standard calibration means may also be employed in view of the accuracy of the bore.

When a salt bath is used, the glass becomes opaque on the outer surface. This opacity can be removed by, for example, grinding.

Barrels produced in accordance with the invention may be used with advantage in, for example, syringe-barrel assemblies such as are described in the specification of my British Patent No. 495,798.

I claim:

1. Method for the manufacture of a tubular glass article of accurate internal dimensions, comprising applying an oversize glass tube closed at one end to a mandrel of accurate size, immersing said tube with its contained mandrel in a liquid maintained at a temperature at which the glass becomes soft but below the temperature at which the glass becomes sticky, and applying vacuum to the interior of the tube while immersed whereby the total external pressure due to vacuum and immersion causes shrinkage of the tube to the size of the mandrel.

2. Method for the manufacture of a tubular glass article of accurate internal dimensions, comprising successively applying an oversize glass tube length closed at one end to a series of mandrels of successively smaller sizes, heating said tube length when applied to each mandrel in a liquid maintained at a temperature at which the glass becomes soft but below the temperature at which the glass becomes sticky, and applying vacuum to the interior of said tube length during each immersion.

3. Method for the manufacture of tubular glass articles of accurate internal dimensions, comprising applying an oversize glass tube closed at one end to a series of superposed mandrels of accurate size, immersing said tube with its contained mandrels in a liquid maintained at a temperature at which the glass becomes soft but below the temperature at which the glass becomes sticky, applying vacuum to the interior of the tube while immersed, removing the tube and its contained mandrels from the liquid, and nicking and breaking the tube into short lengths at points opposite the ends of the superposed mandrels.

SAMUEL JAMES EVERETT.